(12) United States Patent
Hopping et al.

(10) Patent No.: US 9,868,525 B2
(45) Date of Patent: Jan. 16, 2018

(54) LOW SPEED AIRFOIL DESIGN FOR AERODYNAMIC IMPROVED PERFORMANCE OF UAVS

(71) Applicant: The Boeing Company, Chicago, IL (US)

(72) Inventors: Bradley M. Hopping, Florissant, MO (US); Timothy M. Garrett, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 140 days.

(21) Appl. No.: 14/865,851

(22) Filed: Sep. 25, 2015

(65) Prior Publication Data

US 2017/0088260 A1    Mar. 30, 2017

(51) Int. Cl.
*B64C 3/14* (2006.01)
*B64C 39/02* (2006.01)
*B64C 3/34* (2006.01)

(52) U.S. Cl.
CPC .............. *B64C 39/024* (2013.01); *B64C 3/14* (2013.01); *B64C 3/34* (2013.01); *B64C 2201/104* (2013.01); *Y02T 50/12* (2013.01)

(58) Field of Classification Search
CPC .... B64C 3/00; B64C 3/10; B64C 3/14; B64C 3/16; B64C 2003/142; B64C 2003/144; B64C 2003/146; B64C 2003/147; B64C 3/34; B64C 2201/104
See application file for complete search history.

(56) References Cited

U.S. PATENT DOCUMENTS

| | | | |
|---|---|---|---|
| 3,952,971 A | 4/1976 | Whitcomb | |
| 4,121,787 A | 10/1978 | Wilby | |
| 4,314,795 A * | 2/1982 | Dadone ................ | B64C 27/463 244/35 R |
| 4,413,796 A * | 11/1983 | Bousquet ................ | B64C 3/14 244/35 R |
| 4,455,003 A * | 6/1984 | Hilbig ................ | B64C 3/14 244/35 R |
| 4,459,083 A * | 7/1984 | Bingham ................ | B64C 11/18 244/35 R |
| 4,524,928 A | 6/1985 | Schmidt et al. | |
| 4,655,412 A * | 4/1987 | Hinkleman ................ | B64C 3/14 244/35 R |

(Continued)

OTHER PUBLICATIONS

Williamson et al.; Summary of Low-Speed Airfoil Data; 2012; University of Illinois at Urbana-Champaign, Department of Aerospace Engineering.*

(Continued)

*Primary Examiner* — Tien Q Dinh
*Assistant Examiner* — Michael A. Fabula
(74) *Attorney, Agent, or Firm* — Miller, Matthias & Hull LLP

(57) ABSTRACT

An airfoil configured for low speed performance in an unmanned aerial vehicle includes an upper surface having an upper surface portion with a top local surface angle magnitude of less than 5 degrees at a subsection of a chord and a lower surface having a lower surface portion with a bottom local surface angle magnitude of less than 5 degrees at the subsection of the chord. The chord is defined by a line starting at a leading edge of the airfoil and extending to a trailing edge of the airfoil.

17 Claims, 6 Drawing Sheets

(56) References Cited

U.S. PATENT DOCUMENTS

| | | | | |
|---|---|---|---|---|
| 4,718,619 A * | 1/1988 | Ashill | B64C 3/14 244/35 A |
| 4,776,531 A * | 10/1988 | Noonan | B64C 27/467 244/35 R |
| 4,813,631 A * | 3/1989 | Gratzer | B64C 9/146 244/209 |
| 4,858,852 A * | 8/1989 | Henne | B64C 3/14 244/198 |
| 5,318,249 A * | 6/1994 | Stoner | B64C 3/14 244/35 R |
| 5,342,004 A * | 8/1994 | Bobbitt | B64C 3/48 244/212 |
| 5,344,102 A * | 9/1994 | Nakadate | B64C 27/467 244/34 R |
| 5,402,969 A * | 4/1995 | Shea | B64C 3/14 244/16 |
| 6,361,279 B1 * | 3/2002 | Rodde | B64C 27/467 244/35 R |
| 6,607,164 B2 * | 8/2003 | Somers | B64C 3/14 244/35 R |
| 6,626,398 B1 | 9/2003 | Cox et al. | |
| 6,651,927 B1 * | 11/2003 | Hackett | B64C 3/14 244/35 R |
| 7,093,792 B2 * | 8/2006 | Fujino | B64C 3/14 244/35 R |
| 7,854,593 B2 * | 12/2010 | Owen | B64C 3/14 244/35 R |
| 8,016,566 B2 * | 9/2011 | Agnihotri | B64C 27/467 416/223 R |
| 8,393,576 B2 | 3/2013 | Lutke et al. | |
| 9,284,050 B2 * | 3/2016 | Bagai | B64C 27/463 |
| 2003/0006340 A1 * | 1/2003 | Harrison | B64C 29/0075 244/12.3 |
| 2004/0135032 A1 * | 7/2004 | Gregg, III | B64C 3/10 244/123.1 |
| 2006/0226283 A1 * | 10/2006 | Shepshelovich | B64C 3/14 244/35 R |
| 2007/0278353 A1 * | 12/2007 | Shepshelovich | B64C 3/14 244/215 |
| 2008/0217486 A1 * | 9/2008 | Colten | B64C 39/024 244/45 R |
| 2010/0123047 A1 * | 5/2010 | Williams | A63H 27/02 244/35 R |
| 2011/0127373 A1 * | 6/2011 | Thomas | B64C 1/34 244/65 |
| 2015/0014482 A1 * | 1/2015 | Weierman | H02S 10/40 244/124 |
| 2016/0368590 A1 * | 12/2016 | Karem | B64F 5/10 |

OTHER PUBLICATIONS

NACA 64(1)-212 MOD B; Airfoil Tools; <http://airfoiltools.com/airfoil/details?airfoil=n64212mb-i>.*

Gunston, Bill; "Aerofoil"; The Cambridge Aerospace Dictionary; Cambridge University Press; 2nd edition; 2009.*

European Search Report related to Application No. 16176649.8 dated Dec. 22, 2016.

Dr. Ing. Luca Cistriani, UAV Design Engineer, RT Organization, Falco UAV Low Reynolds Airfoil Design and Testing at Galileo Avionica, Galileo Avionica Simulators and UAV Business Unit Via Mario Stoppani, 21, 34077, Ronchi Dei Legionari (Gorizia), Italy, Nov. 2007, RTO-MP-AVT-145; 3.3.1-24.

Leon Li, Experimental Testing of Low Reynolds Number Airfoils for Unmanned Aerial Vehicles, A thesis submitted in conformity with the requirements for the degree of Master of Applied Science Graduate Department of Institute for Aerospace Studies University of Toronto, 2013, 1-76.

* cited by examiner

LOW SPEED AIRFOIL DESIGN FOR AERODYNAMIC IMPROVED PERFORMANCE OF UAVS

FIELD

This disclosure relates generally to airfoils used in aircraft and more particularly to an airfoil design suited for Unmanned Aerial Vehicles.

BACKGROUND

Some aircraft designs, particularly unmanned aerial vehicles, use complex wing or airfoil shapes for improved low-speed performance. These airfoils often exhibit severe stall properties that prevent the aircraft from operating over a full range of conditions. Further, these complex shapes are difficult to manufacture, have limited internal volume, and may not be conducive to attaching external components, such as trailing edge flaps.

A side view of a prior art airfoil 10 is illustrated in FIG. 1. The airfoil 10 has an upper surface 12 and a lower surface 14. In order to achieve good performance at low airspeeds, the airfoil 10 is characterized by a complex curvature that increases both structural weight and manufacturing complexity. The thin trailing edge 16 makes it difficult or impossible to integrate trailing edge flaps. The thin profile and high camber reduces interior volume and correspondingly reduces fuel storage capacity. The high camber also increases the difficulty of including the structural components necessary for integrating a deployable (folding) wing into an airframe.

SUMMARY

In an embodiment, an airfoil configured for low speed performance in an unmanned aerial vehicle includes an upper surface having an upper surface portion with a top local surface angle magnitude of less than 5 degrees at a subsection of a chord and a lower surface having a lower surface portion with a bottom local surface angle magnitude of less than 5 degrees at the subsection of the chord. The chord is defined by a line starting at a leading edge of the airfoil and extending to a trailing edge of the airfoil.

In another embodiment, an unmanned aerial vehicle (UAV) includes a fuselage, a propulsion unit mechanically coupled to the fuselage, and an airfoil coupled to the fuselage. The airfoil includes an upper surface having an upper surface portion having a top local surface angle less than 5 degrees at a subsection of a chord and a lower surface having a lower surface portion having a bottom local surface angle less than 5 degrees at the subsection of the chord. The chord is defined by a line starting at a leading edge of the airfoil and extending to a trailing edge of the airfoil.

In yet another embodiment, a method of assembling an unmanned aerial vehicle includes providing a fuselage, attaching a propulsion unit to the fuselage, and attaching an airfoil to the fuselage. The airfoil has an upper surface that includes an upper surface portion having a top local surface angle less than 5 degrees at a subsection of a chord and a lower surface that includes a lower surface portion having a bottom local surface angle less than 5 degrees at the subsection of the chord. The chord is defined by a line starting at a leading edge of the airfoil and extending to a trailing edge of the airfoil.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
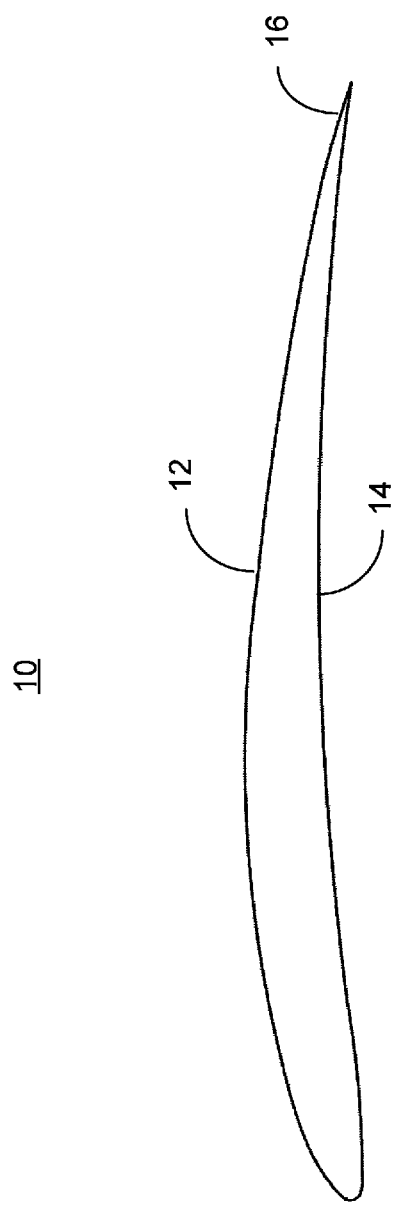
FIG. 1 is a side view of a prior art low speed airfoil used in an unmanned aerial vehicle (UAV)
Figure 2:
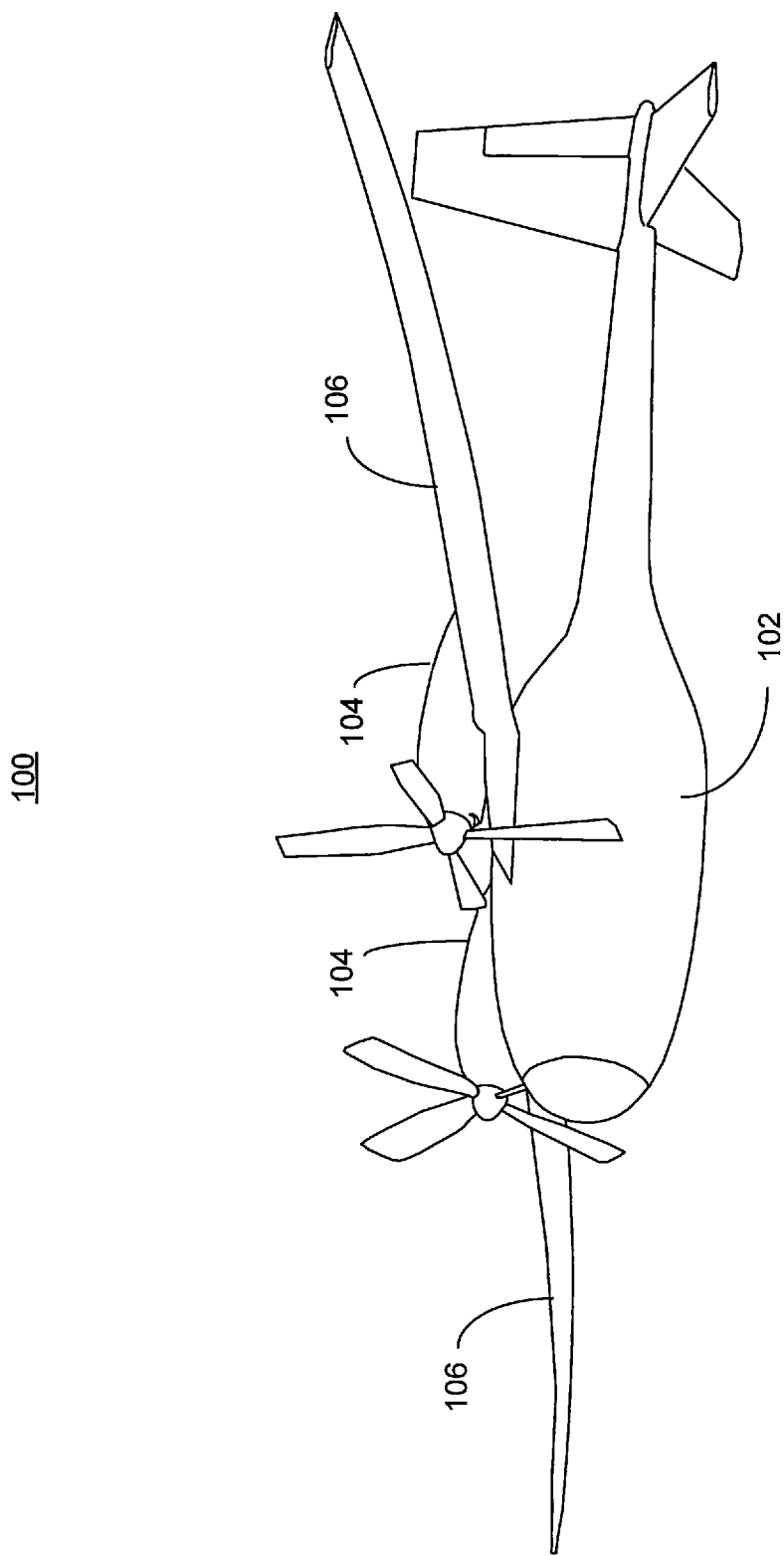
FIG. 2 is a perspective view of a representative UAV.

FIG. 2 is a perspective view of an unmanned aerial vehicle (UAV) 100. The UAV 100 includes a fuselage 102 and a propulsion unit 104, that may be directly or indirectly coupled to the fuselage 102. That is, in some embodiments, the propulsion unit 104 may be coupled to a wing or airfoil 106, or in other embodiments, the propulsion unit 104 may be coupled directly to the fuselage 102. In other embodiments, multiple propulsion units 104 may be coupled to the airfoil 106. The airfoil 106 is configured to improve the performance of the UAV 100 with respect to lift at zero angle of attack and to reduce drag on the lower surface of the airfoil 106 as discussed in more detail below.

Figure 3:
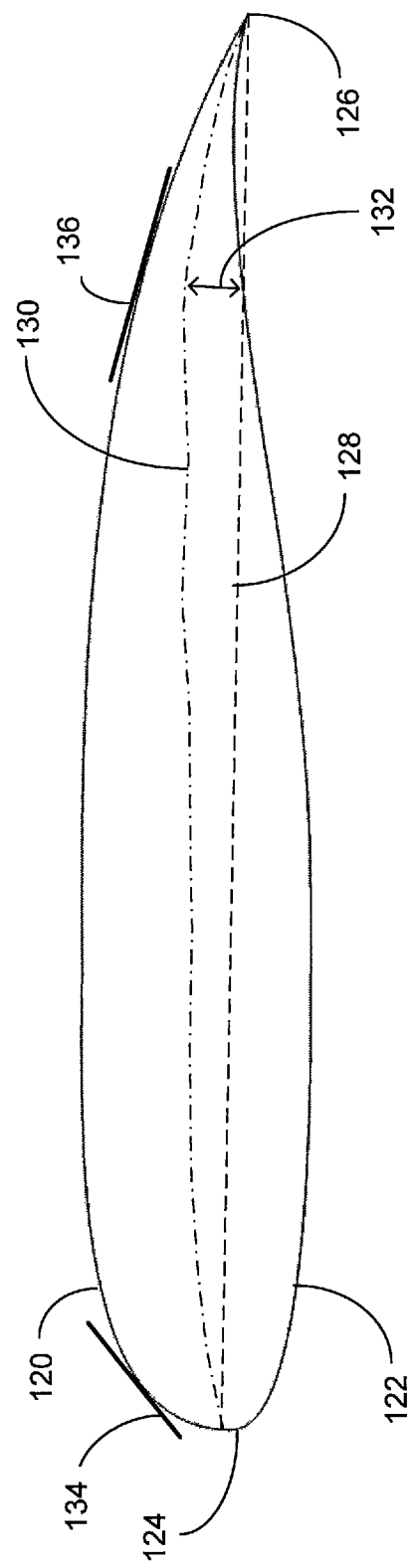
FIG. 3 is cross section view of a section of an airfoil of the UAV of FIG. 2.

FIG. 3 is a cross section of an airfoil 106 in accordance with the current disclosure. The airfoil 106 includes an upper surface 120 and a lower surface 122. A leading edge 124 is driven into oncoming air by movement of the UAV 100. The trailing edge 126 is where the upper surface 120 and the lower surface 122 meet opposite the leading edge 124. The chord is defined as a straight line between the leading edge 124 and the trailing edge 126. It is common to normalize an airfoil front-to-back distance to the length of the chord, as is done in FIGS. 4 and 5 below. This is noted as x/c, where x is the current point and c is the length of chord. That is, the center point of the chord is defined as an x/c of 0.5 or 50%.

A mean camber line 130 is defined as the vertical midpoint between the upper surface 120 and the lower surface 122. The airfoil camber 132 is defined as the maximum distance from the chord 128 to the mean camber line 130. At any point on the airfoil 106, the local surface angle is defined as the angle of a line tangent to the point. A first local surface angle 134 is positive while a second local surface angle 136 is negative. Local surface angles are discussed more below.

Figure 4:
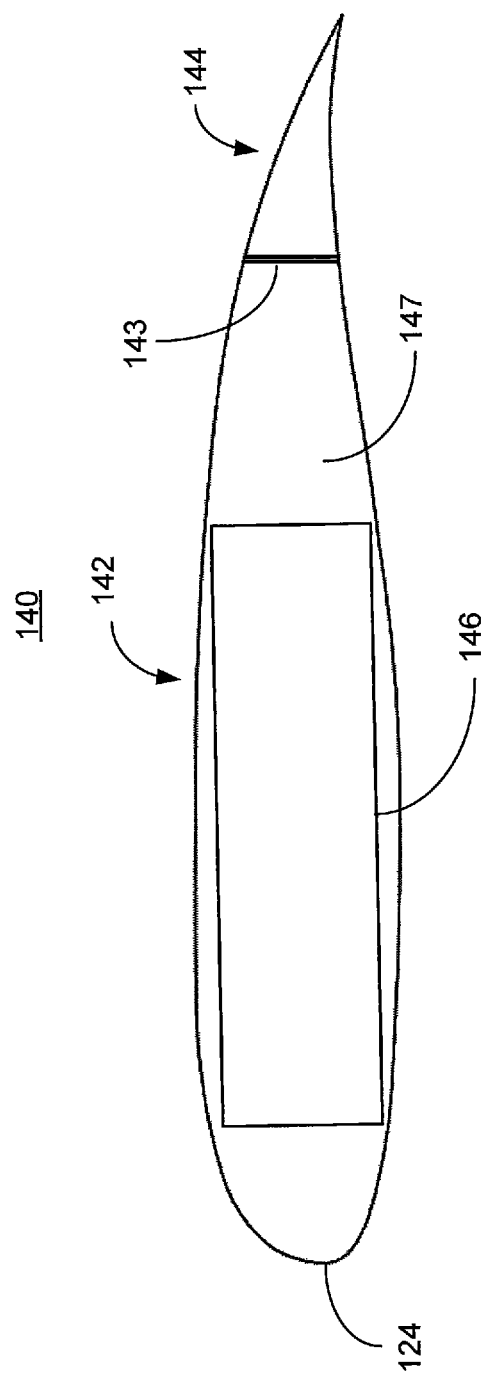
FIG. 4 is a cross section view of a section of another embodiment of an airfoil of the UAV of FIG. 2.

FIG. 4 illustrates an airfoil 140 which is a variation of the airfoil 106 of FIG. 3. In this embodiment, the airfoil 140 is in two sections, a main section 142 and a flap 144. The flap 144 may be attached to an aft end 143 of the main section 142 to complete the airfoil 140. When coupled together, whether fixed or moveably, the main section 142 and the fully refracted flap 144 generally match the shape of the airfoil 106 of FIG. 3. Both airfoils 106 and 140 may also include a tank 146. In other embodiments, the tank 146 may be created by simply sealing the inner surfaces of the airfoil 106, 140 so that fuel or other liquid can be pumped directly into an interior space 147 of the airfoil 106, 140.

Figure 5:
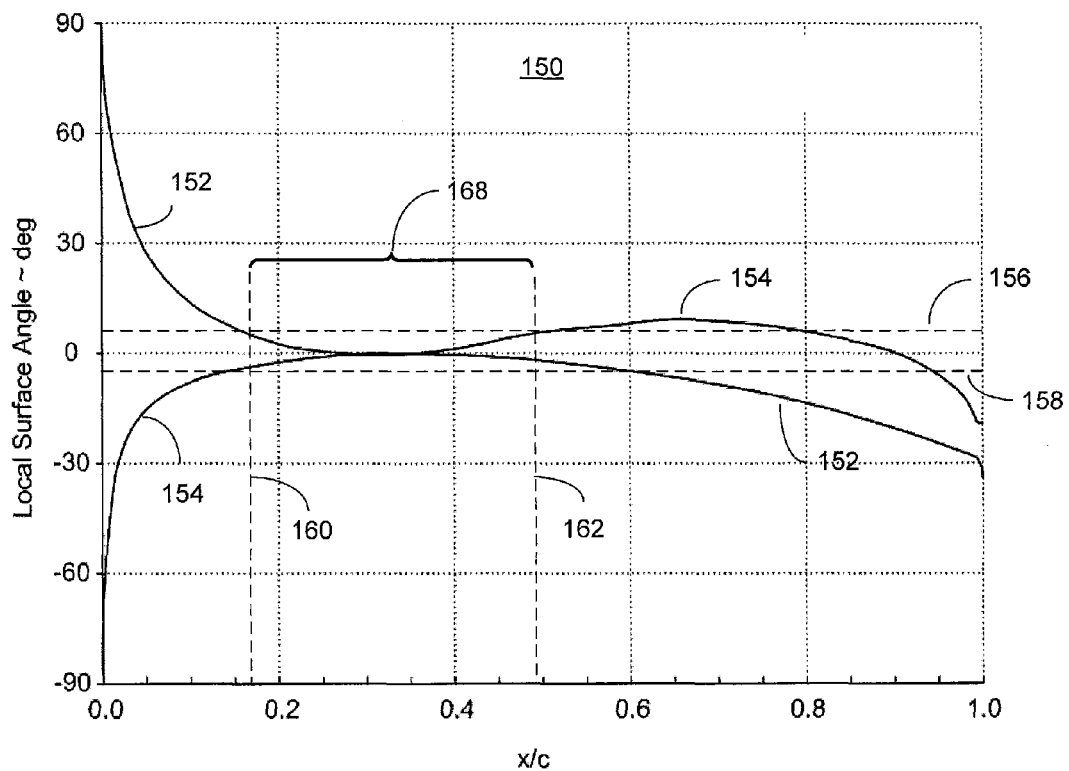
FIG. 5 is a chart showing local surface angle for upper and lower surfaces of the airfoils of FIGS. 3 and 4.

FIG. 5 is a chart 150 showing a local surface angle 152 for the upper surface 120 of the airfoil 106 and a local surface angle for the lower surface 122 of the airfoil 106. The upper surface local surface angle starts out highly positive as the upper surface 120 rises quickly from the leading edge 124 and begins to decrease as the upper surface 120 flattens. The local surface angle 152 falls to less than 5 degrees (line 156) at a distance divided by chord length (x/c) of a little less than 20%, indicated by line 160.

The lower surface 122 has a high negative local surface angle 154 from the leading edge 124 and falls to less than −5 degrees (line 158) at a distance from the leading edge 124 of approximately 20% of x/c. Both the upper surface 120 and lower surface 122 local surface angles have a magnitude (absolute value) of less than about 5 degrees until the local surface angle of the lower surface 122 exceeds 5 degrees at a little less than 50% of x/c, indicated by line 162. Both the upper surface 120 and the lower surface 122 have overlapping sections with local surface angle magnitudes of less than 5 degrees at a subsection 168 of the chord from about 27% of the chord to about 38% of the chord, or more. In an embodiment, the subsection 168 of chord span where both upper and lower surfaces 120 and 122 have local surface angles of less than 5 degrees is from 30% to 35% of the chord, measured from the leading edge 124. In other embodiments, the subsection of chord span, where this overlap occurs may vary but is generally in the front half of the airfoil and generally covers 5% or more of the airfoil chord length.

Figure 6:
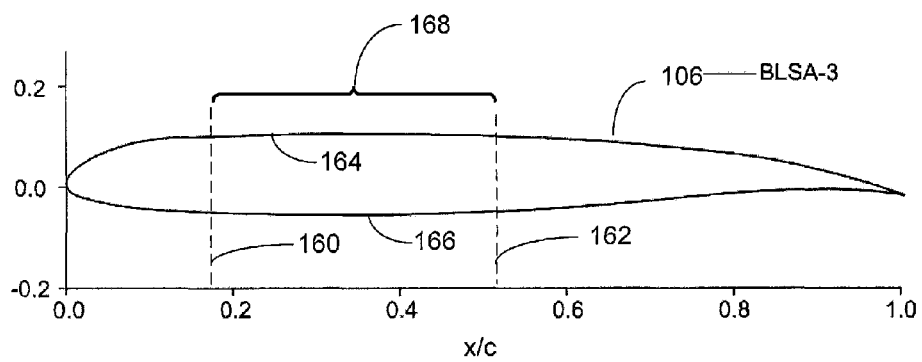
FIG. 6 is another cross section view of the airfoil of FIG. 3.

FIG. 6 illustrates one embodiment of the airfoil 106 showing the subsection 168 described above between lines 160 and 162. That is, the subsection 168 is that portion of the airfoil 106 with both the upper surface portion 164 and the lower surface portion 166 that have local surface angles with a magnitude of less than 5 degrees. In the illustrated embodiment, the subsection 168 has both the upper surface portion 164 and lower surface portion 166 have local surface angles less than 5 degrees occurs between lines 160 and 162.

Many characteristics of the airfoil 106 or airfoil 140 distinguish their design from conventional UAV airfoils which are thinner top-to-bottom and have very high camber, making them difficult to manufacture and having little internal volume. The airfoils 106 and 140 have a bulbous front.

The airfoils 106, 140 exhibit a "virtual camber" by way of the top surface height above the leading edge 124. The long flat portions 164, 166 of the upper and lower surfaces 120 and 122, respectively produce increased lift at zero angle of attack which leads to better stall performance. This allows the UAV 100 to operate at slower speeds without risk of a catastrophic stall. More specifically, the airfoil 106 achieves maximum lift/drag ratios at lower angle-of-attack compared to other current low speed airfoils. The resulting wide margin of angle of attack between maximum lift-to-drag and stall angle-of-attack means the airfoil 106 can operate at its maximum potential even in the presence of atmospheric turbulence compared to other high performance low-speed airfoils.

The low angle portion 166 of the lower surface reduces drag and improves flight efficiency. In an embodiment, the lower surface 122 has less than 10% of the drag attributable to the upper surface 120. The increased height of the wing increases interior volume that accommodates wing tanks in general and fuel storage in particular. The increased height between upper surface 120 and lower surface 122 also allows separate flaps 144 to be attached to the main section 142 creating the possibility of adjustable flaps or more easily changed aft profiles for different operating conditions. Finally, the increased height makes it easier to moveably attach the airfoil 106 to the fuselage 102, for example, when folding airfoils are advantageous for storage and transportation of the UAV 100.

Figure 7:
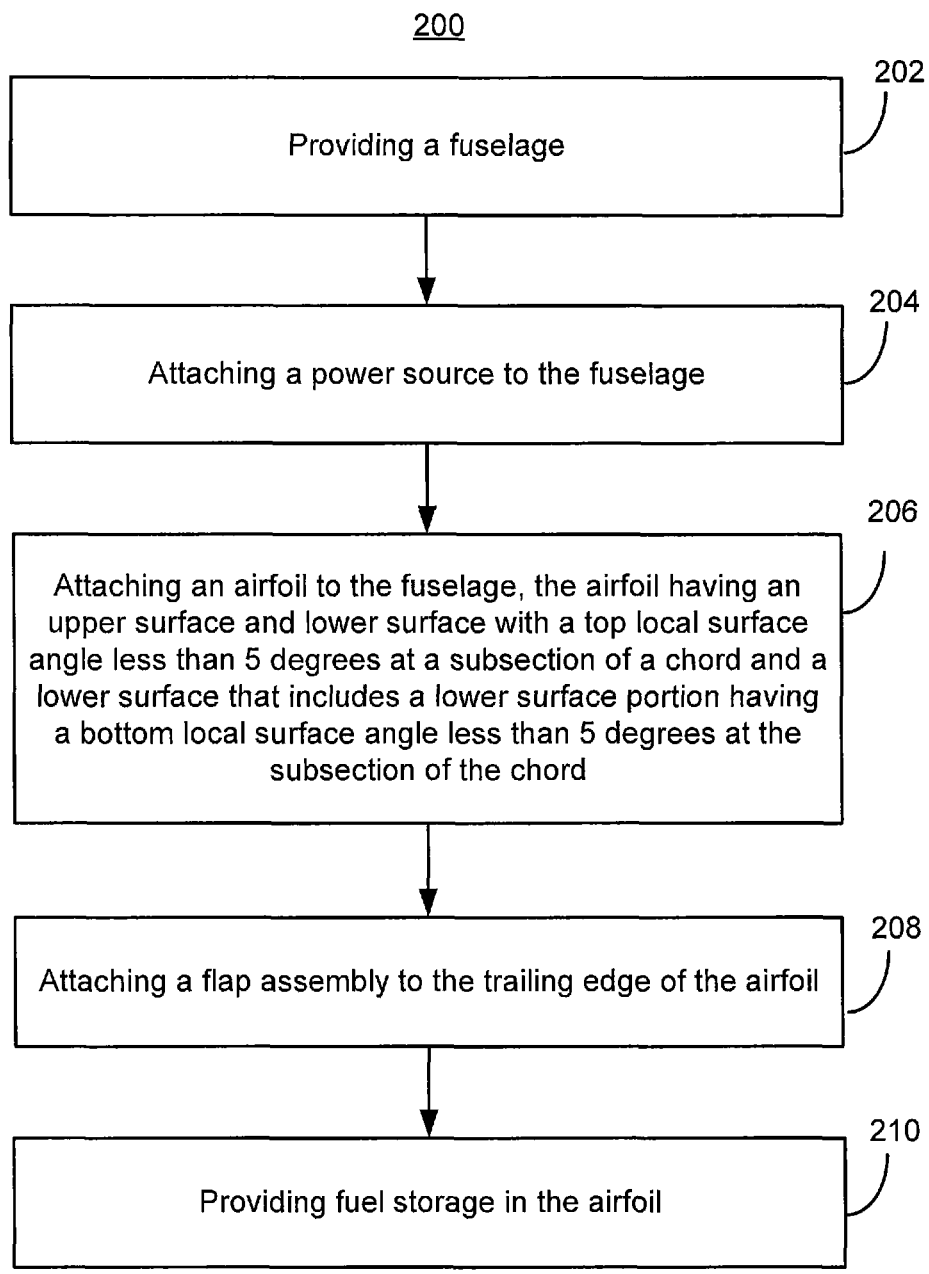
FIG. 7 is an illustration of operations performed in assembling a UAV having the airfoil of FIG. 3 or FIG. 4 in accordance with the current disclosure.

FIG. 7 is a flowchart of a method 200 of assembling an unmanned aerial vehicle (UAV) 100. At block 202, a fuselage 102 is provided. At block 204, a propulsion unit 104 may be attached to the fuselage 102. In various embodiments, the propulsion unit 104 may be attached directly to the fuselage 102, as is seen in most single engine UAV's, or two or more the propulsion units 104 may be attached to airfoils 106 that in turn are attached to the fuselage 102 as shown in FIG. 2.

At block 206, an airfoil 106 may be attached to the fuselage 102. The airfoil 106 has an upper surface 120 that includes an upper surface portion 164 having a top local surface angle magnitude less than 5 degrees at a subsection 168 of a chord 128, wherein the chord 128 is defined by a line starting at a leading edge 124 of the airfoil 106 and extending to a trailing edge 126 of the airfoil 106, and a lower surface 122 that includes a lower surface portion 166 having a bottom local surface angle magnitude less than 5 degrees at the subsection of the chord. That is, in an overlapping portion of the airfoil viewed in cross section, the both the upper surface 120 and the lower surface 122 have a local surface angle between −5 degrees and +5 degrees. In an embodiment, the airfoil 106 has a maximum thickness extending from about 20% to about 40% of the chord from a leading edge 124 of the airfoil. The maximum thickness in this area of the airfoil 106 creates a 'virtual camber' that increases lift at zero angle of attack. In another embodiment, the airfoil subsection 168 of the chord 128 includes a point 30% from a leading edge 124 of the airfoil 106 measured along the chord 128.

Optionally at block 208, a flap assembly may be attached to an aft end 143 of a main section 142 of an airfoil 140.

Fuel storage may be provided in either airfoil 106 or airfoil 140 at block 208 using a tank 146 or simply sealing an interior space of the airfoil 106 or a main section 142 of airfoil 140.

UAVs 100 or conventional aircraft that use airfoils 106, 140 with at least a major portion having the shape described above exhibit improved stall characteristics, less lower surface drag, and have greater interior storage compared to conventional low-speed airfoil designs. Further, airfoils 106, 140 in accordance with this design are easier to manufacture because they have fewer and lower radius curves compared to previously used wings. For example, some prior art airfoils use a reflex camber. An airfoil in accordance with the current description has a non-reflex camber.

While only certain embodiments have been set forth, alternatives and modifications will be apparent from the above description to those skilled in the art. These and other alternatives are considered equivalents and within the spirit and scope of this disclosure and the appended claims.

What is claimed:

1. An airfoil for an unmanned aerial vehicle, the airfoil comprising:
   an upper surface having an upper surface portion with a top local surface angle magnitude of less than 5 degrees at a subsection of a chord, wherein the chord is defined by a line starting at a leading edge of the airfoil and extending to a trailing edge of the airfoil;
   a lower surface having a lower surface portion with a bottom local surface angle magnitude of less than 5 degrees at the subsection of the chord; and
   a maximum thickness defined between the upper surface and the lower surface, wherein the maximum thickness extends a length from substantially 20% to substantially 40% of the chord.

2. The airfoil of claim 1, wherein the subsection of the chord covers a range from 27% of the chord to 38% of the chord.

3. The airfoil of claim 1, wherein the subsection of the chord covers a range from 30% of the chord to 35% of the chord.

4. The airfoil of claim 1, wherein a camber of the airfoil is located at a trailing 1/3 of the chord, wherein the camber is a maximum distance between the chord and a mean camber line.

5. The airfoil of claim 1, wherein at least 75% of the lower surface is at or below the chord.

6. The airfoil of claim 1, further comprising a tank between the upper surface and the lower surface.

7. The airfoil of claim 1, wherein the airfoil has a non-reflex camber.

8. The airfoil of claim 1, wherein the bottom local surface angle produces a lower surface drag attributable to the lower surface of the airfoil and the top local surface angle produces an upper surface drag attributable to the upper surface of the airfoil, and wherein the lower surface drag is less than 10% of the upper surface drag.

9. An unmanned aerial vehicle (UAV) comprising:
   a fuselage;
   a propulsion unit mechanically coupled to the fuselage; and
   an airfoil coupled to the fuselage, the airfoil including:
   an upper surface having an upper surface portion having a top local surface angle magnitude less than 5 degrees at a subsection of a chard, wherein the chord is defined by a line starting at a leading edge of the airfoil and extending to a trailing edge of the airfoil, a lower surface having a lower surface portion having a bottom local surface angle magnitude less than 5 degrees at the subsection of the chord, and a maximum thickness defined between the upper surface and the lower surface, wherein the maximum thickness extends a length from substantially 20% to substantially 40% of the chord.

10. The UAV of claim 9, wherein the subsection of the chord encompasses a point on the chord 30% from a front of the airfoil.

11. The UAV of claim 10, wherein a camber of the airfoil is located at a trailing 1/3 of the chord, wherein the camber is a maximum distance between the chord and a mean camber line.

12. The UAV of claim 9, wherein the airfoil is configured to store fuel tank.

13. The UAV of claim 9, wherein the airfoil includes an attached flap.

14. A method of assembling an unmanned aerial vehicle, the method comprising:
   providing a fuselage;
   attaching a propulsion unit to the fuselage; and
   attaching an airfoil to the fuselage, the airfoil having an upper surface that includes an upper surface portion having a top local surface angle magnitude less than 5 degrees at a subsection of a chord, wherein the chord is defined by a line starting at a leading edge of the airfoil and extending to a trailing edge of the airfoil, a lower surface that includes a lower surface portion having a bottom local surface angle magnitude less than 5 degrees at the subsection of the chord, and a maximum thickness defined between the upper surface and the lower surface, wherein the maximum thickness extends a length from substantially 20% to substantially 40% of the chord.

15. The method of claim 14, further comprising:
   attaching a flap assembly to an aft end of a main section of the airfoil.

16. The method of claim 14, further comprising:
   providing for fuel storage in the airfoil.

17. The method of claim 14, wherein attaching the airfoil to the fuselage comprises attaching the airfoil to the fuselage wherein the subsection of the chord includes a point 30% of a chord length from the leading edge of the airfoil.

* * * * *